(12) United States Patent
Khosravi et al.

(10) Patent No.: US 8,504,693 B2
(45) Date of Patent: Aug. 6, 2013

(54) METHOD AND APPARATUS FOR OPERATING SYSTEM STREAMING

(75) Inventors: Hormuzd M. Khosravi, Portland, OR (US); Yasser Rasheed, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 12/454,927

(22) Filed: May 26, 2009

(65) Prior Publication Data

US 2010/0306399 A1 Dec. 2, 2010

(51) Int. Cl.
*G06F 15/16* (2006.01)
*G06F 13/00* (2006.01)
*G06F 13/12* (2006.01)

(52) U.S. Cl.
USPC ............ 709/227; 709/231; 709/236; 710/74; 711/112

(58) Field of Classification Search
USPC ............... 709/231, 212, 219, 223, 226, 227, 709/236; 370/395.52; 463/42; 710/15, 74; 713/2; 719/310; 711/112
See application file for complete search history.

(56) References Cited

U.S. PATENT DOCUMENTS

| | | | |
|---|---|---|---|
| 6,412,009 B1* | 6/2002 | Erickson et al. | 709/228 |
| 6,728,711 B2* | 4/2004 | Richard | 1/1 |
| 6,834,342 B2* | 12/2004 | Halliday et al. | 713/168 |
| 6,845,403 B2* | 1/2005 | Chadalapaka | 710/5 |
| 7,127,602 B1* | 10/2006 | Bakke et al. | 713/2 |
| 7,313,614 B2* | 12/2007 | Considine et al. | 709/223 |
| 7,617,290 B1* | 11/2009 | Cheriton et al. | 709/212 |
| 7,627,651 B2* | 12/2009 | Joy et al. | 709/219 |
| 2003/0217149 A1* | 11/2003 | Crichton et al. | 709/225 |
| 2003/0225861 A1* | 12/2003 | Iwamura et al. | 709/219 |
| 2005/0066333 A1* | 3/2005 | Krause et al. | 719/310 |
| 2006/0031547 A1* | 2/2006 | Tsui et al. | 709/231 |
| 2006/0149860 A1* | 7/2006 | Diamant | 710/15 |
| 2007/0253430 A1* | 11/2007 | Minami et al. | 370/395.52 |
| 2008/0032801 A1* | 2/2008 | Brunet de Courssou | 463/42 |
| 2008/0059600 A1* | 3/2008 | Bestler | 709/212 |
| 2008/0140816 A1* | 6/2008 | Burokas et al. | 709/222 |
| 2008/0244254 A1* | 10/2008 | Cromer et al. | 713/2 |
| 2010/0115098 A1* | 5/2010 | De Baer et al. | 709/226 |

OTHER PUBLICATIONS

"iSCSI Simplifies Storage Area Networks", White Paper Intel® Server Adapters, 2007, 8 pages.
"Preboot Execution Environment (PXE) Specification" Version 2.1,Intel Corporation with special contributions from SystemSoft™, Sep. 20, 1999, 103 pages.
R. Fielding et al., "Hypertext Transfer Protocol—HTTP/1.1", Network Working Group, RFC 2068, http://www.ietf.org/rfc/rfc2068.txt. Jan. 1997, 163 pages.
J. Satran et al., "Internet Small Computer Systems Interface (iSCSI)", Network Working Group, RFC 3720, http://www.ietf.org/rfc/rfc3720.txt. Apr. 2004, 258 pages.
P. Sarkar et al., "Bootstrapping Clients using the Internet Small Computer System Interface (iSCSI) Protocol", Network Working Group, RFC 4173, http://tools.ietf.org/html/rfc4173. Sep. 2005, 13 pages.

* cited by examiner

*Primary Examiner* — Aaron Strange
(74) *Attorney, Agent, or Firm* — Barnes & Thornburg LLP

(57) ABSTRACT

A method and apparatus for traversing a firewall between an Intranet and the Internet without the use of a proxy server is provided. Internet Small Computer Systems Interface (iSCSI) streaming over a firewall is provided by tunneling iSCSI over Hypertext Transport Protocol (Security) (HTTP (S)).

15 Claims, 9 Drawing Sheets

METHOD AND APPARATUS FOR OPERATING SYSTEM STREAMING

FIELD

This disclosure relates to Operating System (OS) streaming and in particular to OS streaming over firewalls.

BACKGROUND

The Small Computer Systems Interface (SCSI) is a standard set of protocols for communicating with Input/Output (I/O) devices such as, storage devices, media changers and printers. The Internet SCSI (iSCSI) protocol defines a method which uses existing Internet infrastructure and management facilities to transport the SCSI protocols over Transport Control Protocol/Internet Protocol (TCP/IP). The iSCSI protocol allows exchange of iSCSI commands using an IP network, that is, provides support for a Storage Area Network (SAN).

A client computer connected to a SAN may not include non-volatile memory for storing the operating system and/or applications, that is, may be "diskless". A server may stream an operating system and/or application to a "diskless" client computer over a Storage Area Network (SAN).

In order to "boot", that is, load the operating system, a "diskless" client receives an operating system and/or application image which is streamed to the "diskless" client over the SAN. A client computer that includes non-volatile storage (for example, a Hard Disk Drive (HDD) or flash-based memory) may only periodically receive the entire operating system image and/or application image and may also receive updates (deltas) to the operating system image and/or application image.

Streaming an operating system image and/or application image to a client computer allows a "gold" operating system image to be stored on a remote storage area network (SAN) that can be easily managed and updated instead of having to individually update each client computer. In order to initiate the remote boot of the operating system, a special bootloader is launched. The bootloader is pre-configured to point to the appropriate storage server where the desired OS image resides. Methods for loading and executing the bootloader include Pre-Boot Execution Environment (PXE) and/or Built In Operating System (BIOS)-based Option ROM (OROM), each of which has well known security and manageability challenges, which somewhat defeat the primary purpose of reducing operational expenditure. Virtualization technology may also be used to virtualize remote storage and load particular operating system images that view remote storage as "local".

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
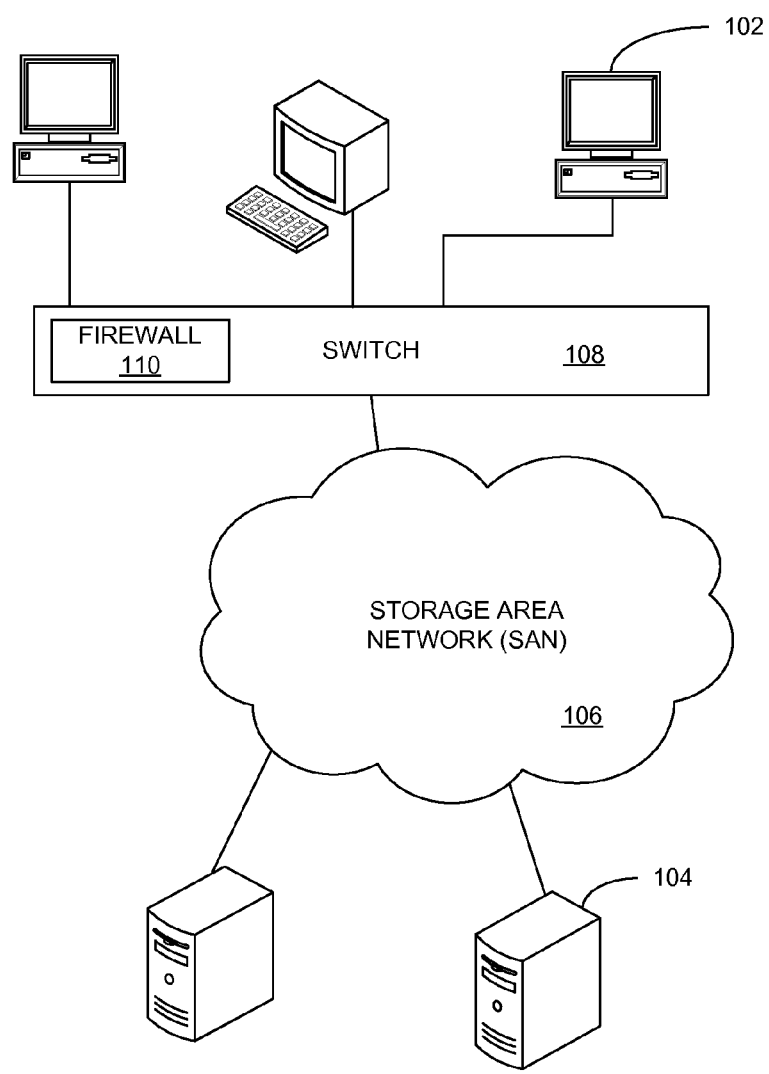
FIG. 1 illustrates a plurality of client computers and storage servers coupled to a Storage Area Network (SAN)

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Personalization of an operating system image and/or application image for each user (or group of users) is difficult because a significant portion of the operating system must be streamed and running on a client computer first in order to authenticate the user before loading personal settings, applications and personal data. Another problem is the lack of appropriate security for the information flowing over the network (Internet), which may contain sensitive intellectual property and/or private end-user data.

The Internet Small Computer System Interface (SCSI) (iSCSI) protocol is defined in Internet Engineering Task Force (IETF) Request For Comments (RFC) 3720. It allows the American National Standards Institute (ANSI) SCSI block Input/Output (I/O) protocol to be sent over a network using Transport Control Protocol/Internet Protocol (TCP/IP). The Internet Small Computer System Interface (SCSI) (iSCSI) protocol uses existing Internet infrastructure and management facilities to transport the SCSI protocols over TCP/IP. The iSCSI protocol allows exchange of iSCSI commands using an IP network, that is, provides support for a Storage Area Network (SAN). The iSCSI protocol is typically hosted inside a data center over a local area network (Intranet) instead of over the Internet.

A firewall is computer hardware or software that prevents unauthorized access to private data accessible via a local area network (Intranet) by computer users on the Internet. However, iSCSI protocols do not expect to communicate outside an Intranet that may be protected from unauthorized access from users outside the Intranet by a firewall.

Typically, a proxy server may be used to traverse a corporate firewall. However, in order to use a proxy server, a client system must first obtain information about the proxy server which is not feasible in an environment in which the Operating System (OS) is streamed to the client computer. Thus, client computers on a local area network (Intranet) over which the OS is streaming to the client computer cannot use iSCSI to access an iSCSI service hosted by an Internet Service Vendor (ISV) accessible via the Internet outside a firewall. Furthermore, client computers 102 on the Internet cannot use iSCSI to access enterprise servers on a local area network.

An embodiment of the invention allows the iSCSI protocol to traverse a firewall by tunneling the iSCSI protocol over a computer network protocol application layer. For example, the tunneling of the iSCSI protocol can be performed using Hypertext Transport Protocol (HTTP) (application layer (level 7) of the Open Systems Interconnect Reference model (OSI model). In an embodiment, the iSCSI protocol (session layer (level 5) of the OSI model) is tunneled over HTTP by encapsulating the iSCSI protocol in a HTTP packet in order to traverse the firewall. The tunneling is independent of the host Operating System (OS).

FIG. 1 illustrates a plurality of client computers 102 and storage servers 104 accessible via a non-local area network, for example, an iSCSI Storage Area Network (SAN) 106. Each of the plurality of client computers 102 and the plurality of storage servers 104 includes a network interface that supports transfer of data packets using Transport Control Protocol (TCP)/Internet Protocol (IP).

Any one of the plurality of storage servers 104 may stream an operating system and/or application to any one of the client computers 102 over the iSCSI Storage Area Network (SAN). In the embodiment shown, the client computers 102 are coupled to the iSCSI SAN through a switch 108 which may include a firewall 110 to protect the client computers 102 on a local network from authorized access by devices (for example, client computers or storage servers) accessible via the iSCSI SAN 106. A firewall 110 is a hardware or software device at the boundary between two networks. All network traffic between the iSCSI SAN and the client computer 102 on the local area network must pass through the firewall 110. The firewall 110 allows some network traffic to pass while blocking other network traffic.

Network traffic on a local network (Intranet) between the client computers 102 does not pass through the firewall 110 but all network traffic between the storage servers 104 and the client computers 102 must pass through the firewall 110 between the local network and the iSCSI SAN (non-local network) to client computers 102. In the embodiment shown, the iSCSI SAN is a non-local network separated by a switch from the client computers 102.

Figure 2:
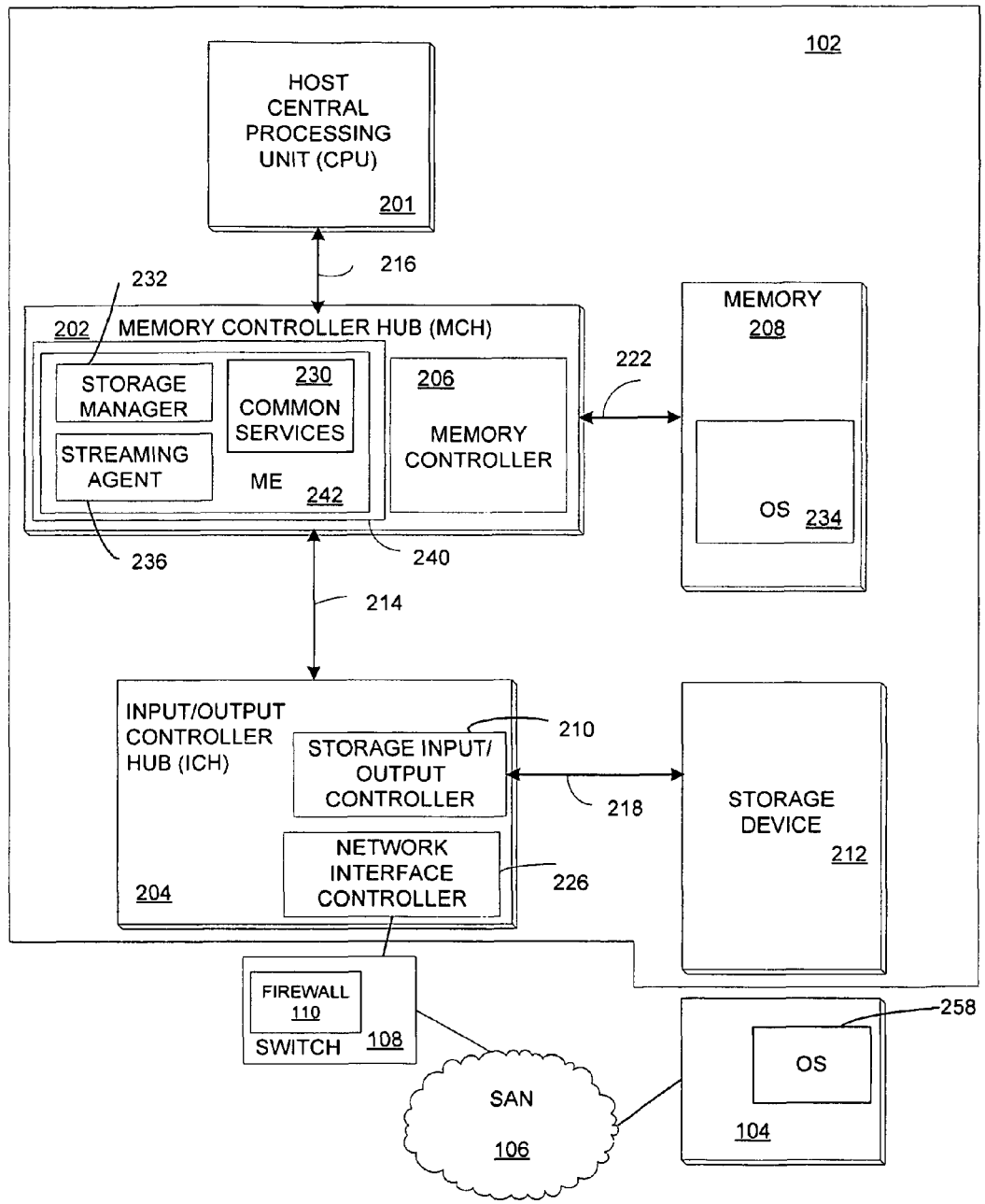
FIG. 2 is a block diagram of an embodiment of any one of the client computers shown in FIG. 1.

FIG. 2 is a block diagram of an embodiment of any one of the client computers 102 shown in FIG. 1. The client computer 102 includes an embodiment of a streaming agent 236 to allow an operating system 258 to be streamed from a remote storage server 104 and stored as client OS 234 in memory 208 by tunneling iSCSI over Hypertext Transport Protocol (HTTP), that is, sending the iSCSI protocol in the message body of a HTTP packet.

The client computer 102 includes a processor 201, a Memory Controller Hub (MCH) 202 and an Input/Output (I/O) Controller Hub (ICH) 204. The MCH 202 includes a memory controller 206 that controls communication between the processor 201 and memory 208. The MCH 202 also includes an embedded microcontroller (co-processor) 240. A small amount of memory 208 is dedicated to execute management engine code and management engine run-time data. The microcontroller 240 runs a lightweight microkernel operating system that provides a low power, Out-of-Band (OOB) execution engine for management services. In an embodiment, management engine code (firmware) is stored compressed in Flash memory (not shown).

At system initialization management engine (ME) firmware 242 is loaded from the Flash memory (not shown) and stored in memory in the MCH 202 that is independent of memory 208. The management engine firmware 242 includes a storage manager 232, a common services module 230 and the streaming agent 236. The microcontroller 240 operates independently from the processor 201. The processor 201 and MCH 202 communicate over a system bus 216.

The processor 201 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory 208 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 204 may be coupled to the MCH 202 using a high speed chip-to-chip interconnect 214 such as Direct Media Interface (DMI). DMI supports 2 Gigabit/second concurrent transfer rates via two unidirectional lanes.

The ICH 204 may include a storage Input/Output (I/O) controller 210 for controlling communication with at least one storage device 212 coupled to the ICH 204. The storage device 212 may be, for example, a disk drive, Digital Video Disk (DVD) drive, Compact Disk (CD) drive, Redundant Array of Independent Disks (RAID), tape drive or other storage device. The ICH 204 may communicate with the storage device 212 over a storage protocol interconnect 218 using a serial storage protocol such as, Serial Attached Small Computer System Interface (SAS) or Serial Advanced Technology Attachment (SATA) or other storage protocol.

The ICH 204 may also include a Network Interface Communications (NIC) controller 226 for controlling communications through a network switch 108 over an iSCSI SAN 106 with a storage server 104. An Operating System 258 (which may be a "gold" OS that is streamed to client computer 102) may be stored in a remote storage server 104 accessible via the SAN 106 and streamed over the SAN 106 to the client computer 102.

The memory 208 may store a "client" operating system 234 that may be the streamed "gold" OS that is also stored in the remote storage server 104. The operating system 234 may include a storage driver to control the operation of the storage input/output controller 210 and a network controller driver to control the operation of the NIC 226. The NIC 226 may support wired or wireless network communications protocols.

Figure 3:
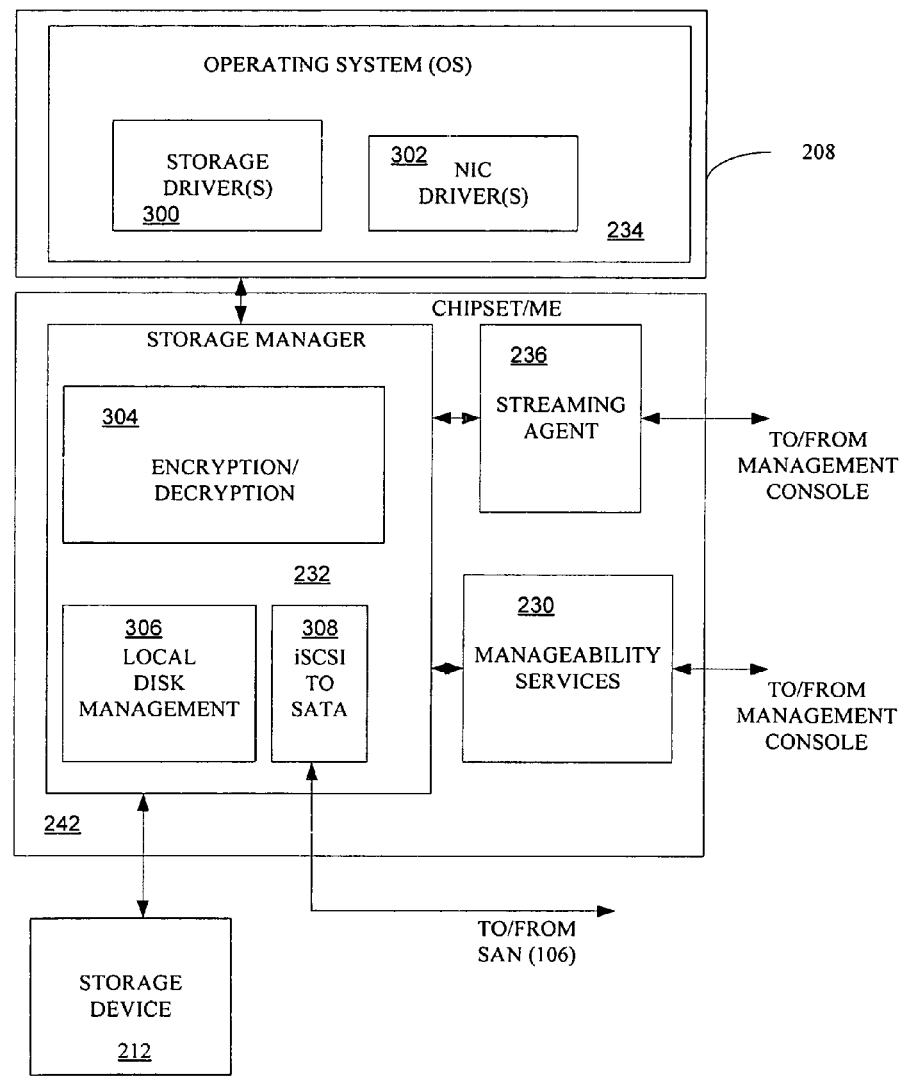
FIG. 3 is a block diagram illustrating software modules included in the manageability engine firmware and stored in memory of the client computer shown in FIG. 2 to allow an operating system to be streamed from a remote storage server according to the principles of the present invention.

FIG. 3 is a block diagram illustrating software modules included in the manageability engine firmware 242 and in memory 208 shown in FIG. 2 to allow an operating system 234 to be streamed over a SAN 106 from a remote storage server 104 according to the principles of the present invention.

A remote management console (not shown) performs remote setup and configuration to configure a manageability services ("common services") module 230 and full disk encryption/decryption services 304 in a system, for example, the client computer 102. The manageability engine firmware 242 includes manageability services module 230, streaming agent module 236, encryption/decryption module 304 and local disk management module 306. After manageability services 230 are enabled and the system is accessible via a communications network (storage area network (106)), the system is authenticated over the communications network and a connection is established with the remote management console. In an embodiment, after a user enters credentials (for example, username and password) via a pre-boot user login screen in the client computer 102, a local Kerberos client captures the credentials and authenticates the user against the user's account on Microsoft Corporations' Active Directory.

The manageability services module 230 passes the user information to the streaming agent 236 via the remote management console. The streaming agent 236 contacts the remote management console and acquires the user-specific information. This includes the user profile, data volumes, and group memberships. In an embodiment of a client that includes a local storage device 212, a partition of the local storage device 212 may be reserved as a local cache for the user. The manageability services module 230 determines the SAN Logical Unit Number(s) LUN(s) to read data from and instructs the storage manager 232 to establish the iSCSI connections to those SAN LUN(s). The manageability services module 230 also instructs the storage manager 232 to create a virtual (local) SATA drive as a combination of remote volumes.

The storage manager 232 includes a hardware-based storage abstraction layer (iSCSI to SATA) 308 that presents a (logical) remote iSCSI storage device as a local (for example, Serial ATA (SATA)) device which avoids manageability and security issues associated with Pre-Boot Execution Environment (PXE) and the need for boot-loaders stored in Option Read Only Memories (OROM).

The system Built In Operating System (BIOS) stored in non-volatile memory in the client computer 102 while executed by the processor 201 discovers the virtual (local) SATA drive and requests an Operating System boot from the virtual (local) SATA drive through local disk management 306 and the iSCSI to SATA module 308. The actual Operating System boot via the SAN 106 is hidden in the hardware-based storage abstraction layer from the BIOS.

Figure 4:
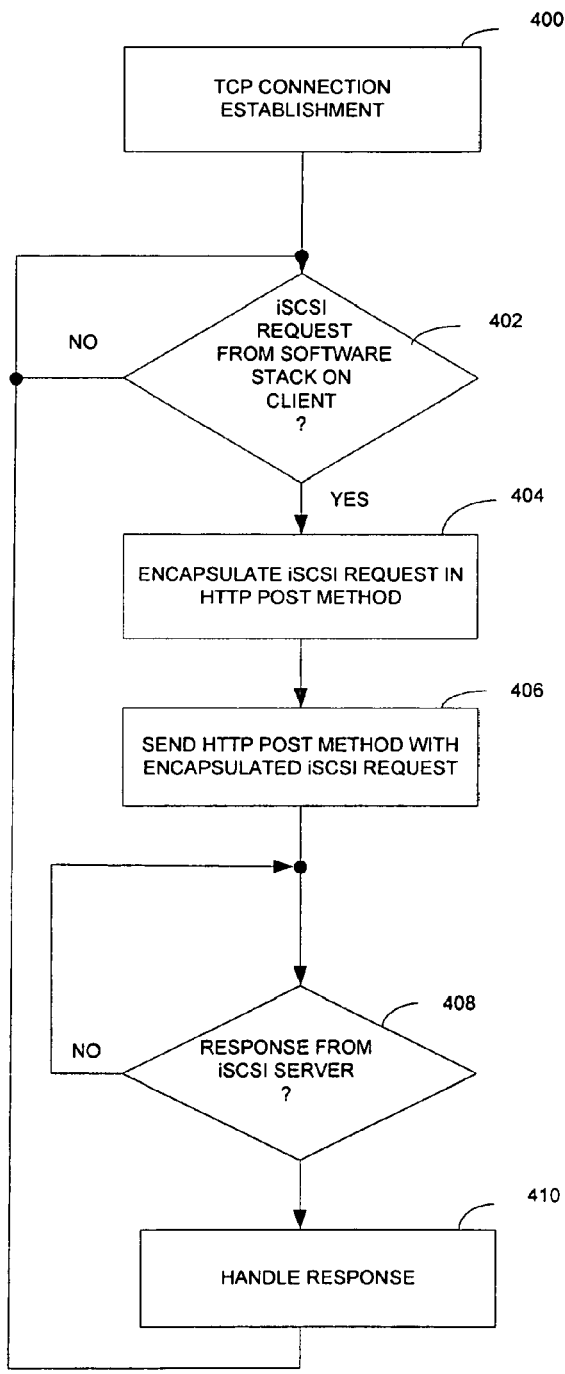
FIG. 4 is a flow chart illustrating an embodiment of a method for encapsulating an iSCSI request in a HTTP request performed in any of the client computers shown in FIG. 1.

FIG. 4 is a flow chart illustrating an embodiment of a method for encapsulating an iSCSI request in a HTTP request performed in any of the client computers 102 shown in FIG. 1.

HTTP is an application-level protocol for example, layer 7 of the 7 layer Open System Interconnect Reference Model (OSI model)) for distributed, collaborative, hypermedia information. HTTP is a generic, stateless, object-oriented protocol. HTTPS (Hypertext Transfer Protocol Secure) is HTTP with the addition of a network security protocol (for example, Transport Layer Security (TLS) or Secure Sockets Layer (SSL), layer 6 (presentation layer) of the 7 layer OSI model). The security protocol encrypts the HTTP request prior to transmission and decrypts a received HTTP response. The HTTP protocol is a request/response protocol that typically operates over TCP/IP connections with a default TCP port (for example, port 80). A client sends a request to a server in the form of a request method over a connection with the server. The server responds with a response indicating success or failure (error code).

HTTP messages are communicated over a connection (a transport layer virtual circuit established between two programs for the purpose of communication). The HTTP message (request or response) is the basic unit of HTTP communication and includes a structured sequence of octets matching a defined syntax. Both types of messages include a start-line, one or more header fields (headers), an optional message body and an empty line separating the message header and the message body.

Most HTTP communication is initiated by a user agent and includes a request to be applied to a resource on an origin server. A tunnel is used when the communication needs to pass through a firewall (intermediary). The tunnel acts as a relay point between two connections without changing the message.

At block 400, a TCP connection is established between a client computer 102 and a storage server 104. TCP provides reliable, ordered delivery of a stream of bytes between the client computer 102 and the storage server 104.

A three way handshake is used between the client computer 102 and the storage server 104 to establish a TCP connection. Prior to the three way handshake, the storage server 104 binds to a TCP port (for example, port 80) to open the port for connections. First the client computer 102 sends a synchronization packet to the TCP port to initiate a connection. The synchronization packet's sequence number is set to a random value. Next, the storage server 104 replies with an acknowledgement packet and a synchronization packet. Finally, the client computer 102 responds to the storage server 104 with an acknowledgement packet.

In another embodiment, a Transport Layer Security (TLS) connection can be established between the client computer 102 and the storage server 104 in addition to the TCP connection. The TLS connection supports a secure unilateral (server authentication only) or bilateral (mutual authentication) connection mode. For example, the TLS connection allows HTTPS to be used to forward an iSCSI request instead of HTTP. Processing continues with block 402.

At block 402, the storage manager 232 waits to receive an iSCSI request from firmware 242, for example, the request may be sent by manageability services module 230. If an iSCSI request is received, processing continues with block 404 to handle the request.

At block 404, an iSCSI request has been received. The iSCSI request is encapsulated in a HTTP POST method.

Figure 5:
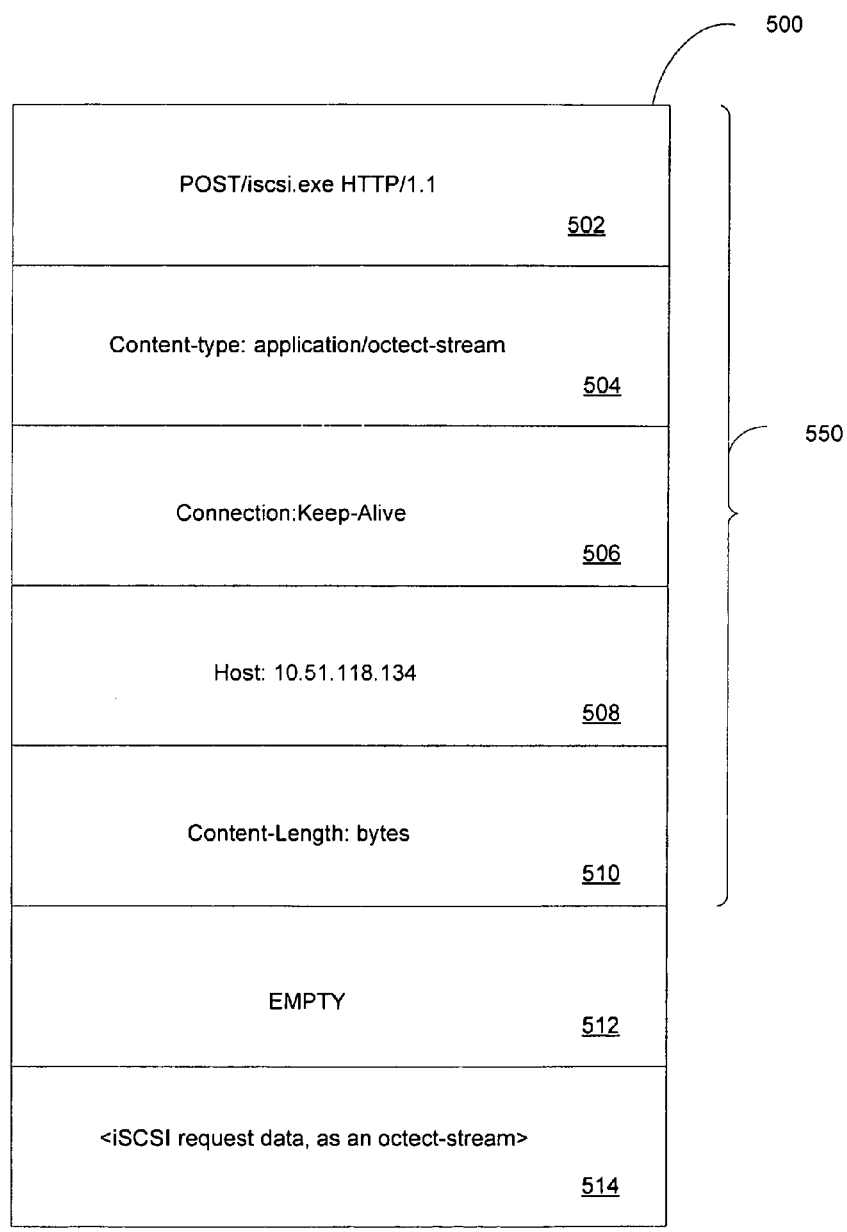
FIG. 5 illustrates an example of an iSCSI request encapsulated in an HTTP request.

FIG. 5 illustrates an example of an iSCSI request encapsulated in an HTTP POST method. Turning to FIG. 5, the HTTP POST method is used by a client computer 102 to send an iSCSI request to a storage server 104. The HTTP POST method 500 includes a HTTP header 550 and a message body 514. An iSCSI Protocol Data Unit (PDU) 514 may be stored in the message body 514. The HTTP POST method header 550 and HTTP POST method message body 514 are separated by an empty line 512.

An empty line 512, that is, a line with nothing preceding a Carriage Return (CR) /Line Feed (LF) represents the end of the HTTP header 550 and the beginning of the message body, that is, the iSCSI PDU 514. In a system based on American Standard Code for Information Interchange (ASCII), a code used for a Carriage Return is 0D (hexadecimal) and the code used for a Line Feed is 0A (hexadecimal).

The iSCSI PDU is transmitted in the HTTP POST method message body 514 as an octet stream, not as regular ASCII characters and is the only data in the message body 514. The iSCSI PDU may include SCSI command blocks. For example, the SCSI command blocks may be SCSI-3 SCSI command description blocks defined by ANSI INCITS 306-1998. The iSCSI PDU can include a SCSI Command Descriptor Block (CDB) that includes a READ command identifying a Logical Block Address (LBA) from which to read one or more blocks of data from a storage device accessible via the remote storage server 104.

The HTTP header 550 includes a plurality of header fields. Each header field includes a name followed by a colon (":") and the field value.

HTTP header field 502 includes the method to be applied to the resource, the identifier of the resource and the protocol version of HTTP used. As shown in FIG. 5, the method to be applied to the source is "POST", the identifier of the resource (Request Uniform Resource Identifier (URI)) is "/iSCSI.exe" and the HTTP version is "HTTP/1.1". The method token, (POST) indicates the method to be performed on the resource identified by the Uniform Resource Identifier (URI). POST is an optional method that allows a block of data to be provided to a data-handling process. The function to be performed is dependent on the Request-URI.

HTTP header field 504 specifies the "content-type" that indicates the media type of the entity-body to be transferred. As shown in FIG. 5, the content-type is "application/octet stream".

HTTP header field 506 specifies the "connection". As shown in FIG. 5, the connection token is "keep alive", so the connection is not closed after the message has been transmitted.

HTTP header field 508 specifies the IP address (in dotted-decimal form) of the "host" to which the HTTP POST method is to be sent.

HTTP header field 510 includes the "Content-Length" entity-header field indicates the size of the message body, in decimal number of octets, to be transferred.

Returning to FIG. 4, at block 406, the HTTP POST method with encapsulated iSCSI protocol request is sent over the SAN 106 to the remote storage server 104. Processing continues with block 408.

At block 408, the client computer 102 waits for a response from the remote storage server 104 to the HTTP POST method. If a response is received, processing continues with block 410.

At block 410, the client computer 102 processes the response and processing continues with block 402 to wait for another iSCSI request.

Figure 6:
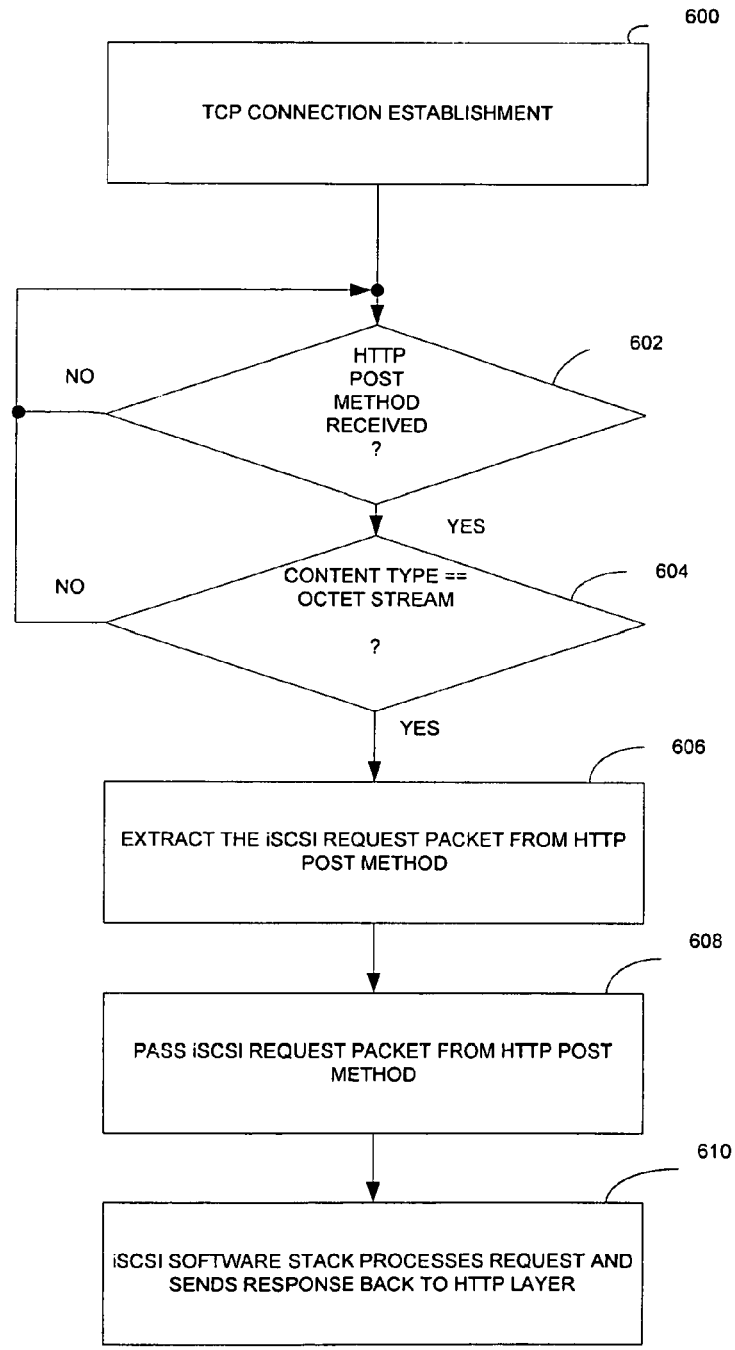
FIG. 6 is a flow chart illustrating a method for encapsulating an iSCSI response in a HTTP response performed in any of the storage servers shown in FIG. 1.

FIG. 6 is a flow chart illustrating a method for encapsulating an iSCSI response in a HTTP response performed in any of the storage servers 104 shown in FIG. 1.

At block 600, a TCP connection is established between the client computer 102 and the storage server 104 as discussed in conjunction with FIG. 4.

At block 602, the storage server 104 waits for a HTTP POST method 500 to be received. If a HTTP POST method 500 is received, processing continues with block 604.

At block 604, the storage server 104 checks the content type HTTP header field 504 in the HTTP POST method 500. If the content type is "octet stream", the HTTP POST method 500 includes iSCSI request data and processing continues with block 606. If not, processing continues with block 602 to wait for another HTTP POST method 500 to be received.

At block 606, the storage server 104 extracts the iSCSI request packet from the received HTTP POST method 500. Processing continues with block 608.

At block 608, the storage server 104 passes the extracted iSCSI request 514 to the iSCSI software stack in the storage server 104. Processing continues with block 610.

At block 610, iSCSI software stack processes the extracted iSCSI request and sends an iSCSI response back to the HTTP layer which forwards the ISCSI response 716 encapsulated in an HTTP response message 700 to the client computer 102.

Figure 7:
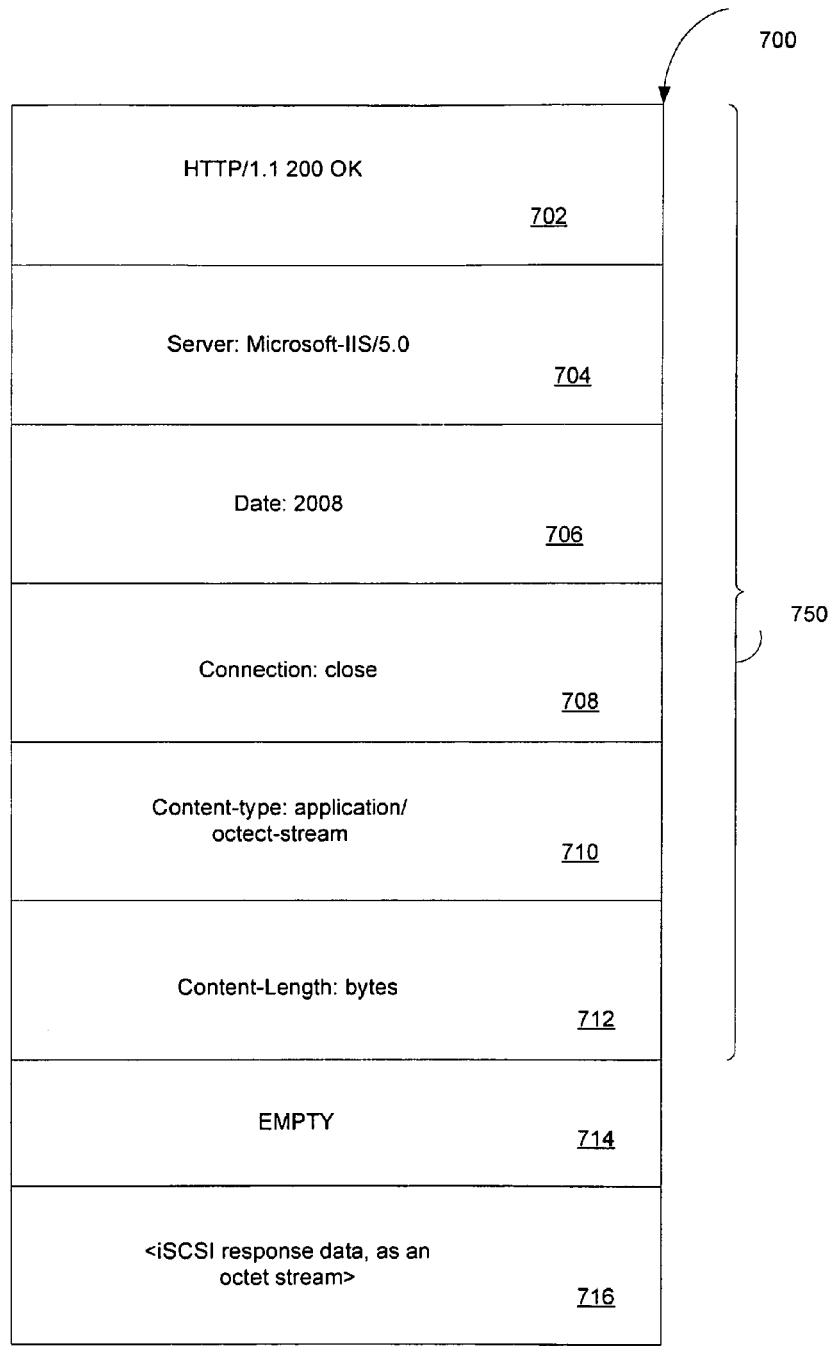
FIG. 7 illustrates an example of an iSCSI response encapsulated in a HTTP response.

FIG. 7 illustrates an example of an iSCSI response 716 encapsulated in a HTTP response 700. The HTTP response 700 includes a HTTP response header 750, an empty HTTP response field 714 and the iSCSI response 716.

The HTTP response header 750 includes a plurality of HTTP response header fields.

HTTP response header field 702 includes the protocol version of HTTP used ("HTTP/1.1") and a status code for the HTTP POST method. In the example shown in FIG. 7, the status code is "200 OK", indicating the request succeeded.

HTTP response header field 704 defines the server that is, information about the software used by the storage server to handle the request. In the example shown in Table 2, the software is Microsoft-IIS/5.0.

HTTP response header field 706 stores the date, that is, the date at which the message originated.

HTTP response header field 708 specifies the "connection". The connection entity-header field (connection:) allows the sender to specify options that are desired for that particular connection. As shown in FIG. 7, the connection token is "close", specifying that the connection is closed after the HTTP message 700 has been received.

HTTP response header field 710 specifies the content type, that is, the media type of the entity-body to be transferred. As shown in FIG. 7, the content type is "application/octet-stream".

HTTP response header field 712 specifies the content length, that is, the size of the message body, in decimal number of octets (8-bit bytes), to be transferred.

Figure 8:
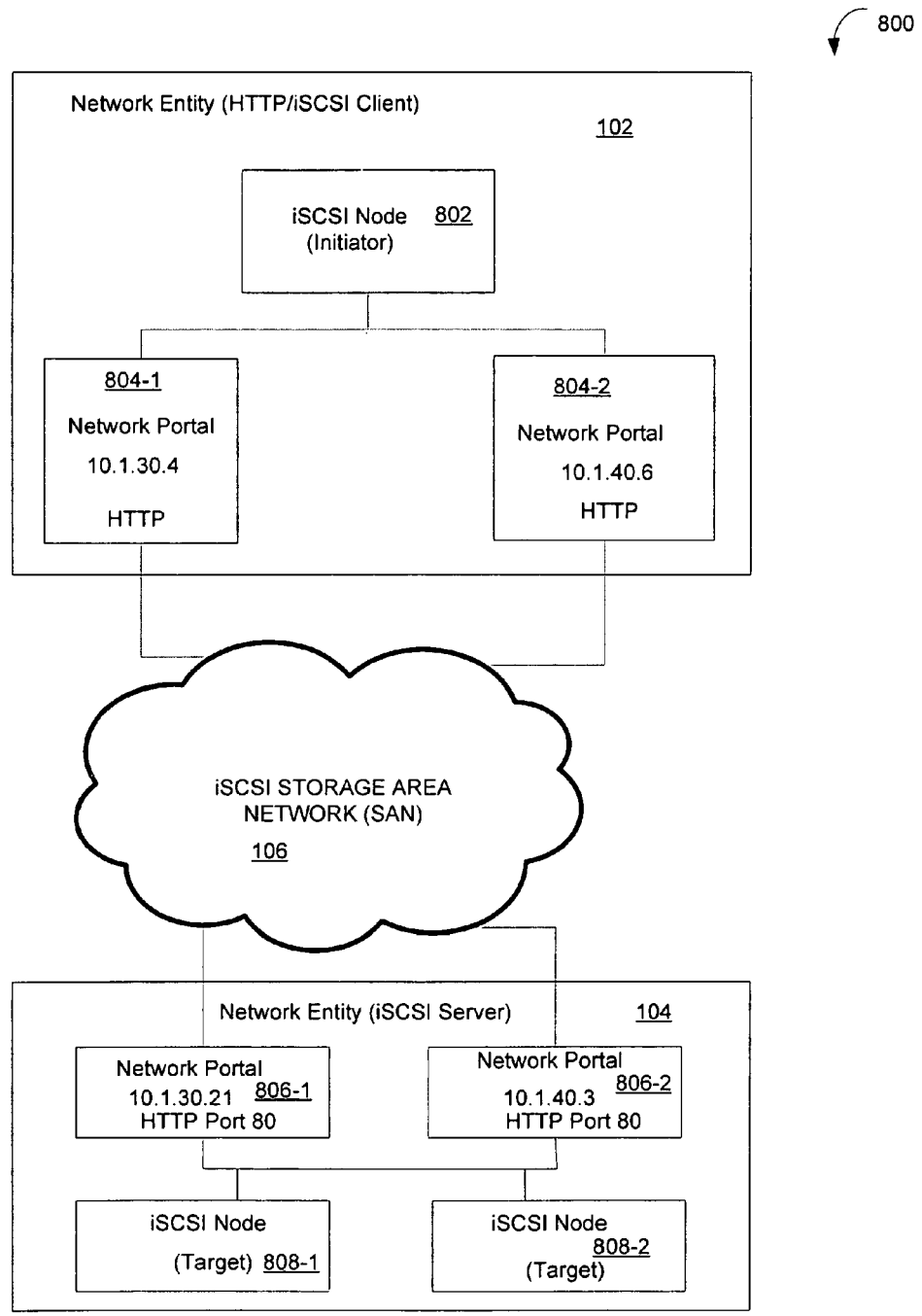
FIG. 8 is a block diagram of an embodiment of a system that includes a client computer and a storage server.

FIG. 8 is a block diagram of an embodiment of a system 800 that includes a client computer 102 and a storage server 104. The system 800 shown in FIG. 8 illustrates an embodiment of how multiple iSCSI Nodes 808-1, 808-2 (targets) can coexist within the same Network Entity 104 and can share Network Portals 806-1, 806-2 (IP addresses and HTTP ports).

More than one HTTP connection may be opened by the client computer (HTTP/iSCSI client) 102 to a single iSCSI target/HTTP server 104. The HTTP/iSCSI client 102 can utilize the open connections in different manners to handle Input/Output performance optimization and load balancing.

Figure 9:
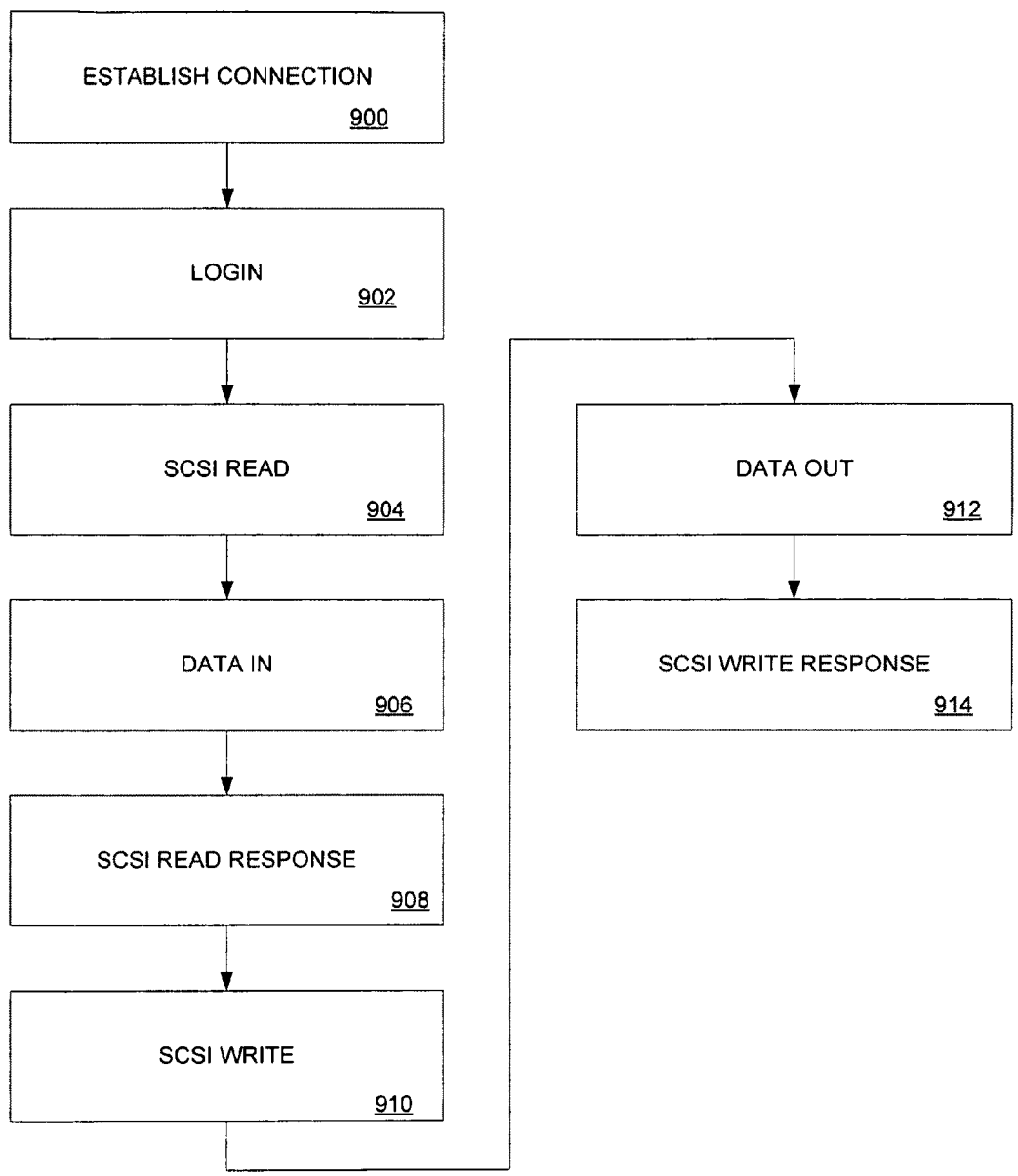
FIG. 9 is a flow chart that illustrates a method for encapsulating iSCSI in HTTP messages to perform a SCSI READ operation and a SCSI WRITE operation in a remote storage server.

FIG. 9 is a flow chart that illustrates a method for encapsulating iSCSI in HTTP POST methods to perform a SCSI READ operation and a SCSI WRITE operation in a remote storage server 104.

At block 900, a TCP connection is established between the client computer 102 and the remote storage server 104 as discussed earlier. Processing continues with block 902.

At block 902, an iSCSI login phase is performed using iSCSI login requests and iSCSI login responses to enable a TCP connection for iSCSI use. The login phase establishes a TCP connection for iSCSI to use. The end stations are authenticated. The iSCSI protocol uses layer 5 (session layer) of the OSI 7 layer model. The target (remote storage server 104) listens on a TCP port for incoming connections. The initiator begins the login process by connection to one of the TCP ports. Negotiation of the iSCSI session parameters and authentication of the initiator (client computer) and target is performed. The initiator sends a HTTP POST request message with a login request PDU encapsulated in the message in the iSCSI data. The target responds with a response message with an iSCSI login response PDU stored in the iSCSI data.

After the login is completed, the initiator may send SCSI commands and data to logical units in the target by encapsulating the SCSI commands and data in iSCSI PDUS over the established iSCSI session. Processing continues with block 904.

At block 904, the SCSI initiator in the client computer 102 sends a SCSI READ Command Descriptor Block (CDB) in an iSCSI PDU over the established connection. Processing continues with block 906.

At block 906, in response to the command to read one or more blocks of data, the SCSI target in the storage server 104 returns the requested data block(s) in one or more iSCSI PDUs encapsulated in the iSCSI data of a HTTP response message. Processing continues with block 908.

At block 908, after the last data block has been sent over the established session. The SCSI target sends a SCSI Response PDU encapsulated in a HTTP response message stored in the iSCSI data to the initiator. The SCSI response indicates whether the SCSI READ command completed successfully. Processing continues with block 910.

At block 910, the SCSI initiator in the client computer 102 sends a SCSI Write Command Descriptor Block (CDB) in an iSCSI PDU in iSCSI data in a HTTP POST method over the established connection. Processing continues with block 912.

At block 912, in response to the command to write one or more blocks of data, the SCSI initiator in the client computer 102 sends data block(s) in one or more iSCSI PDUs encapsulated in the message body of a HTTP POST method to the SCSI target in the storage server 104. Processing continues with block 908.

At block 914, after the last data block has been sent over the established session to the SCSI target. The SCSI target sends a SCSI Response PDU encapsulated in the message body 716 of a HTTP response message 700 to the SCSI initiator in the client computer 102. The SCSI response PDU indicates whether the SCSI Write command completed successfully.

An embodiment has been described for HTTP. An embodiment can also be used for tunneling iSCSI using HTTPS. HTTP is a combination of the HTTP protocol and a network security protocol. In an embodiment, the network security protocol may be Secure Sockets Layer (SSL) protocol. The network security protocol is used to encrypt a HTTP message prior to transmission and to decrypt a received HTTP response.

SSL is a protocol that provides both server authentication and encryption. In an embodiment, the iSCSI client validates a certificate received from the remote storage server 104 but does send any certificates to the Server. However, a remote storage server 104 can authenticate the iSCSI client using basic or digest HTTP authentication defined in Request for Comments (RFC) 2617.

The remote storage server 104 may include a web server that is configured to restrict access to a resource in the remote storage server 104. If so, the web server response indicates that the HTTP request is unauthorized and specifies the type of authentication method required.

A method and apparatus for traversing a firewall between an Intranet and the Internet without the use of a proxy server is provided. Secure, authenticated iSCSI streaming over corporate firewalls is provided by tunneling iSCSI over HTTP(S).

The method can be applied to other protocols such as Integrated Drive Electronics (IDE-Redirection. For example, in an embodiment the method can be used for IDE-Redirect (IDER) in Intel AMT/vPro platforms. IDE is a standard interface between a storage device (for example, a floppy disk drive or a Compact Disk (CD) Drive) and a computer. IDE-Redirection emulates an IDE floppy drive or CD drive by encapsulating the IDE protocol in a Transport Control Protocol (TCP) packet over a TCP connection between a managed client and another computer. IDER allows the managed client to use the remote IDE storage device as if it was directly attached to the managed client. For example, IDER can be used to boot the managed client's operating system stored on an IDE storage device in the other computer.

The remote storage accessible using iSCSI can be hosted as a service in an Internet Cloud and be used from a client computer 102 connected to an Intranet even when a firewall between the Intranet and the Internet is blocking all applications from accessing storage devices on the Internet. An embodiment may also be applied to forward iSCSI and other protocol traffic over corporate proxy servers.

An embodiment has been discussed for iSCSI. However, the invention is not limited to iSCSI, an embodiment can be applied to other block oriented storage protocols such as Integrated Drive Electronics (IDE)-Redirect. In an embodiment, the IDE protocol is encapsulated in the message body of a HTTP POST method or HTTP response message as discussed in conjunction with the embodiment for the iSCSI protocol.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. A method comprising:
determining, via a manageability services module of a manageability engine on a client computing device, a storage area network logical unit number to connect to, the storage area network logical unit number corresponds to a logical storage device on a remote storage server;
establishing, on the client computing device, a connection to the remote storage server as a function of the storage area network logical unit number determined via the manageability services module;
presenting, on the client computing device, the logical storage device on the remote storage server as a local storage device;
encapsulating, on the client computing device, a block oriented storage protocol login request in a first Hypertext Transfer Protocol (HTTP) POST message to be forwarded to the remote storage server over a storage area network;
receiving, on the client computing device, a login response to the block oriented storage protocol login request, the login response encapsulated in a first HTTP response message transmitted from the remote storage server;
encapsulating, on the client computing device, a block oriented storage protocol request in a second HTTP POST message to be forwarded to the remote storage server over the storage area network, the block oriented storage protocol request being encapsulated in the second HTTP POST message as a first octet stream; and
receiving, on the client computing device, a response to the block oriented storage protocol request, wherein the response encapsulated in a second HTTP response message transmitted from the remote storage server, and wherein the response to the block oriented storage protocol request being encapsulated in the second HTTP response message as a second octet stream.

2. The method of claim 1, wherein the block oriented storage protocol is Internet Small Computer System Interface (iSCSI).

3. The method of claim 1, wherein the block oriented storage protocol is Integrated Drive Electronics (IDE)-Redirection.

4. The method of claim 1, wherein the first and second HTTP POST messages are Hypertext Transfer Protocol Security (HTTPS) POST messages and the block oriented storage protocol request and the block oriented storage protocol login request are encrypted using Secure Sockets Layer (SSL).

5. The method of claim 1, wherein the block oriented storage protocol request is used to download an operating system from the remote storage server to a diskless client computer.

6. The method of claim 1, wherein the block oriented storage protocol request is used to download an incremental update to an operating system from the remote storage server to a client computer.

7. An apparatus comprising:
 a manageability services module to determine a storage area network logical unit number to connect to, the storage area network logical unit number corresponds to a logical storage device on a remote storage server;
 a storage manager to establish a connection to the remote storage server as a function of the storage area network logical unit number determined by the manageability services module, the storage manager comprises a hardware-based abstraction layer to present a remote storage device of the remote storage server as a local storage device;
 a streaming agent to:
  (i) encapsulate a block oriented storage protocol request in a Hypertext Transfer Protocol (HTTP) POST message to be forwarded to the remote storage server over a storage area network, the HTTP POST message comprises an HTTP header field to specify a content type of the HTTP POST message, and
  (ii) receive a response to the block oriented storage protocol request, wherein the response encapsulated in an HTTP response message transmitted from the remote storage server, and wherein the HTTP response message comprises an HTTP status code header field indicative of a status of the HTTP POST message; and
  wherein the HTTP response message is received from the remote storage server in response to the HTTP header field specifying that the content type of the HTTP POST message is an octet-stream, and wherein the HTTP status code header field of the HTTP response message indicates that the HTTP POST message was successful.

8. The apparatus of claim 7, wherein the block oriented storage protocol is Internet Small Computer System Interface (iSCSI).

9. The apparatus of claim 7, wherein the HTTP POST message is a Hypertext Transfer Protocol Security (HTTPS) POST message and the block oriented storage protocol request is encrypted using Secure Sockets Layer (SSL).

10. The apparatus of claim 7, wherein the block oriented storage protocol request is used to download an operating system from the remote storage server to a diskless client computer.

11. The apparatus of claim 7, wherein the block oriented storage protocol request is used to download an incremental update to an operating system from the remote storage server to a client computer.

12. An article including a machine-accessible medium having associated information, wherein the information, when accessed, results in a machine performing:
 encapsulating a block oriented storage protocol login request in a first Hypertext Transfer Protocol (HTTP) POST message to be forwarded to a remote storage server over a storage area network;
 receiving a login response to the block oriented storage protocol login request, the login response encapsulated in a first HTTP response message transmitted from the remote storage server;
 encapsulating a block oriented storage protocol request as a first octet stream in a second HTTP POST message to be forwarded to the remote storage server over the storage area network, the second HTTP POST message comprises an HTTP header field to specify a content type of the second HTTP POST message;
 receiving a response to the block oriented storage protocol request, the response encapsulated as a second octet stream in a second HTTP response message transmitted from the remote storage server, the second HTTP response message comprises an HTTP status code header field indicative of a status of the second HTTP POST message; and
 wherein the second HTTP response message is received from the remote storage server in response to the HTTP header field specifying that the content type of the second HTTP POST message is an octet-stream, and wherein the HTTP status code header field of the second HTTP response message indicates that the second HTTP POST message was successful.

13. The article of claim 12, wherein the block oriented storage protocol is Internet Small Computer System Interface (iSCSI).

14. A system comprising:
 a dynamic random access memory accessible by a processor;
 a co-processor independent of the processor, the co-processor comprising memory, the memory independent of the dynamic random access memory accessible by the processor, the memory comprising:
  a manageability services module to determine a storage area network logical unit number to connect to, the storage area network logical unit number corresponds to a logical storage device on a remote storage server;
  a storage manager to establish a connection to the remote storage server using the storage area network logical unit number determined by the manageability services module, the storage manager to present the logical storage device of the remote storage server as a local storage device; and
  a streaming agent to:
   (i) encapsulate an Internet Small Computer System Interface (iSCSI) login request in a first Hypertext Transfer Protocol (HTTP) POST message to be forwarded to the remote storage server over a storage area network;
   (ii) receive an iSCSI login response to the iSCSI login request, the iSCSI login response encapsulated in a first HTTP response message transmitted from the remote storage server;
   (iii) encapsulate an iSCSI request as a first octet stream in a second HTTP POST message to be forwarded to the remote storage server over the storage area network, the second HTTP POST message comprises an HTTP header field to specify a content type of the second HTTP POST message, and
   (iv) receive an iSCSI response to the iSCSI request, the iSCSI response encapsulated as a second octet stream in a second HTTP response message transmitted from the remote storage server, the second HTTP response message comprises an HTTP status code header field indicative of a status of the second HTTP POST message; and wherein the second HTTP response message is received from the remote storage server in response to the HTTP header field specifying that the content type of the second HTTP POST message is an octet-stream, and wherein the HTTP status code header field of the second HTTP response message indicates that the second HTTP POST message was successful.

15. The system of claim 14, wherein the first and second HTTP POST messages are Hypertext Transfer Protocol Security (HTTPS) POST messages and the iSCSI request and the iSCSI login request are encrypted using Secure Sockets Layer (SSL).

* * * * *